(12) United States Patent
Gharib et al.

(10) Patent No.: US 10,742,957 B2
(45) Date of Patent: Aug. 11, 2020

(54) THREE-DIMENSIONAL IMAGING SYSTEM

(71) Applicant: CALIFORNIA INSTITUTE OF TECHNOLOGY, Pasadena, CA (US)

(72) Inventors: Morteza Gharib, Altadena, CA (US); Alexei Harvard, Pasadena, CA (US); Scott Hsieh, Anaheim, CA (US); Jian Lu, Laguna Hills, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/209,089

(22) Filed: Dec. 4, 2018

(65) Prior Publication Data

US 2019/0174117 A1   Jun. 6, 2019

Related U.S. Application Data

(62) Division of application No. 13/820,116, filed as application No. PCT/US2010/057532 on Nov. 19, 2010, now Pat. No. 10,182,223.

(60) Provisional application No. 61/380,094, filed on Sep. 3, 2010.

(51) Int. Cl.
| | |
|---|---|
| *H04N 13/207* | (2018.01) |
| *H04N 13/214* | (2018.01) |
| *G06T 7/70* | (2017.01) |
| *G06T 7/593* | (2017.01) |
| *H04N 13/25* | (2018.01) |
| *H04N 13/257* | (2018.01) |

(52) U.S. Cl.
CPC ........... *H04N 13/207* (2018.05); *G06T 7/593* (2017.01); *G06T 7/70* (2017.01); *H04N 13/214* (2018.05); *H04N 13/25* (2018.05); *H04N 13/257* (2018.05); *G06T 2207/10024* (2013.01); *G06T 2207/10028* (2013.01); *G06T 2207/20016* (2013.01); *G06T 2207/30036* (2013.01); *G06T 2207/30244* (2013.01)

(58) Field of Classification Search
CPC ..................................................... H04N 13/207
USPC ........................................................ 348/50
See application file for complete search history.

(56) References Cited

U.S. PATENT DOCUMENTS

| | | |
|---|---|---|
| 4,101,917 A | 7/1978 | Ueda |
| 4,264,921 A | 4/1981 | Pennington et al. |
| 4,512,656 A | 4/1985 | Shinoda et al. |

(Continued)

FOREIGN PATENT DOCUMENTS

| | | |
|---|---|---|
| GB | 2 242 270 A | 9/1991 |
| JP | 2655885 B2 | 9/1997 |

(Continued)

OTHER PUBLICATIONS

Bando, Y., "How to Disassemble the Canon EF 50mm f/1.8 II Lens", 2008, pp. 1-21.

(Continued)

*Primary Examiner* — Yulin Sun
(74) *Attorney, Agent, or Firm* — One LLP

(57) ABSTRACT

Hardware and software configurations, optionally, for performing profilometry of an object are disclosed. An advantageous imaging device is described. An advantageous approach to determining imager position is also described. Each aspect described may be used independently of the other. Moreover, the teaching may find use in other fields including velocimetry, etc.

5 Claims, 11 Drawing Sheets

(56) References Cited

U.S. PATENT DOCUMENTS

| | | |
|---|---|---|
| 4,650,466 A | 3/1987 | Luther |
| 4,727,471 A | 2/1988 | Driels et al. |
| 4,879,664 A | 11/1989 | Suyama et al. |
| 4,880,010 A | 11/1989 | Szilard |
| 4,948,258 A | 8/1990 | Caimi |
| 5,018,854 A | 5/1991 | Rioux |
| 5,031,154 A | 7/1991 | Watanabe |
| 5,071,407 A | 12/1991 | Termin et al. |
| 5,075,561 A | 12/1991 | Rioux |
| 5,168,327 A | 12/1992 | Yamawaki |
| 5,206,498 A | 4/1993 | Sensui |
| 5,216,695 A | 6/1993 | Ross et al. |
| 5,222,971 A | 6/1993 | Willard et al. |
| 5,235,857 A | 8/1993 | Anderson |
| 5,270,795 A | 12/1993 | Blais |
| 5,327,880 A | 7/1994 | Harley et al. |
| 5,351,078 A | 9/1994 | Lemelson |
| 5,373,151 A | 12/1994 | Eckel, Jr. et al. |
| 5,476,100 A | 12/1995 | Galel |
| 5,496,277 A | 3/1996 | Termin et al. |
| 5,527,282 A | 6/1996 | Segal |
| 5,579,444 A | 11/1996 | Dalziel et al. |
| 5,604,344 A | 2/1997 | Finarov |
| 5,714,762 A | 2/1998 | Li et al. |
| 5,745,067 A | 4/1998 | Chou et al. |
| 5,864,359 A | 1/1999 | Kazakevich |
| 5,922,961 A | 7/1999 | Hsu et al. |
| 5,928,260 A | 7/1999 | Chin et al. |
| 5,986,694 A | 11/1999 | Ilino |
| 6,045,623 A | 4/2000 | Cannon |
| 6,112,029 A | 8/2000 | Suda |
| 6,115,553 A | 9/2000 | Iwamoto |
| 6,157,747 A | 12/2000 | Szeliski et al. |
| 6,227,850 B1 | 5/2001 | Chishti et al. |
| 6,229,913 B1 | 5/2001 | Nayar et al. |
| 6,229,959 B1 | 5/2001 | Suda et al. |
| 6,262,803 B1 | 7/2001 | Hallerman et al. |
| 6,271,918 B2 | 8/2001 | Blais |
| 6,278,847 B1 | 8/2001 | Gharib et al. |
| 6,304,284 B1 | 10/2001 | Dunton et al. |
| 6,344,048 B1 | 2/2002 | Chin et al. |
| 6,519,359 B1 | 2/2003 | Nafis et al. |
| 6,545,701 B2 | 4/2003 | Sinclair et al. |
| 6,563,543 B1 | 5/2003 | Doron |
| 6,701,181 B2 | 3/2004 | Tang et al. |
| 6,711,293 B1 | 3/2004 | Lowe |
| 6,748,112 B1 | 6/2004 | Nguyen et al. |
| 6,750,904 B1 | 6/2004 | Lambert |
| 6,765,569 B2 | 7/2004 | Neumann et al. |
| 6,840,107 B2 | 1/2005 | Gan |
| 6,912,293 B1 | 6/2005 | Korobkin |
| 6,915,008 B2 | 7/2005 | Barman et al. |
| 6,943,349 B2 | 9/2005 | Adamec et al. |
| 6,955,656 B2 | 10/2005 | Bergheim et al. |
| 6,965,690 B2 | 11/2005 | Matsumoto |
| 7,006,132 B2 | 2/2006 | Pereira et al. |
| 7,106,375 B2 | 9/2006 | Venturino et al. |
| 7,171,054 B2 | 1/2007 | Fiete et al. |
| 7,236,622 B2 | 6/2007 | Chen et al. |
| 7,260,274 B2 | 8/2007 | Sawhney et al. |
| 7,271,377 B2 | 9/2007 | Mueller et al. |
| 7,340,077 B2 | 3/2008 | Gokturk et al. |
| 7,372,642 B2 | 5/2008 | Rohaly et al. |
| 7,423,666 B2 | 9/2008 | Sakakibara et al. |
| 7,496,226 B2 | 2/2009 | Negahdaripour et al. |
| 7,565,029 B2 | 7/2009 | Zhou et al. |
| 7,605,817 B2 | 10/2009 | Zhang et al. |
| 7,612,869 B2 | 11/2009 | Pereira et al. |
| 7,612,870 B2 | 11/2009 | Graff et al. |
| 7,668,388 B2 | 2/2010 | Bryll |
| 7,715,018 B2 | 5/2010 | Gharib et al. |
| 7,715,918 B2 | 5/2010 | Melvin |
| 7,747,151 B2 | 6/2010 | Kochi et al. |
| 7,819,591 B2 | 10/2010 | Rohaly et al. |
| 7,826,067 B2 | 11/2010 | Gharib et al. |
| 7,894,078 B2 | 2/2011 | Gharib et al. |
| 7,916,309 B2 | 3/2011 | Gharib et al. |
| 8,089,635 B2 | 1/2012 | Gharib et al. |
| 8,179,424 B2 | 5/2012 | Moller |
| 8,190,020 B2 | 5/2012 | Numako et al. |
| 8,401,276 B1 | 3/2013 | Choe et al. |
| 8,472,032 B2 | 6/2013 | Gharib et al. |
| 8,514,268 B2 | 8/2013 | Gharib et al. |
| 8,576,381 B2 | 11/2013 | Gharib et al. |
| 8,619,126 B2 | 12/2013 | Gharib et al. |
| 8,773,507 B2 | 7/2014 | Gharib et al. |
| 2001/0031920 A1 | 10/2001 | Kaufman et al. |
| 2002/0008907 A1 | 1/2002 | Yamamoto |
| 2002/0038120 A1 | 3/2002 | Duhaylongsod et al. |
| 2003/0025811 A1 | 2/2003 | Keelan et al. |
| 2003/0096210 A1 | 5/2003 | Rubbert et al. |
| 2003/0125719 A1 | 7/2003 | Furnish |
| 2003/0160970 A1 | 8/2003 | Basu et al. |
| 2003/0210407 A1 | 11/2003 | Xu |
| 2004/0136567 A1 | 7/2004 | Billinghurst et al. |
| 2004/0155975 A1 | 8/2004 | Hart et al. |
| 2005/0025116 A1 | 2/2005 | Chen et al. |
| 2005/0104879 A1 | 5/2005 | Kaye et al. |
| 2005/0119684 A1 | 6/2005 | Guterman et al. |
| 2005/0168616 A1 | 8/2005 | Rastegar et al. |
| 2005/0251116 A1 | 11/2005 | Steinke et al. |
| 2005/0264668 A1 | 12/2005 | Miyamoto |
| 2006/0041199 A1 | 2/2006 | Elmaleh et al. |
| 2006/0044546 A1 | 3/2006 | Lewin et al. |
| 2006/0092314 A1 | 5/2006 | Silverstein et al. |
| 2006/0098872 A1 | 5/2006 | Seo et al. |
| 2006/0209193 A1 | 9/2006 | Pereira et al. |
| 2006/0228010 A1 | 10/2006 | Rubbert et al. |
| 2006/0285741 A1 | 12/2006 | Subbarao |
| 2007/0008312 A1 | 1/2007 | Zhou et al. |
| 2007/0031064 A1 | 2/2007 | Zhao et al. |
| 2007/0056768 A1 | 3/2007 | Hsieh et al. |
| 2007/0076090 A1 | 4/2007 | Alexander |
| 2007/0078500 A1 | 4/2007 | Ryan et al. |
| 2007/0146700 A1 | 6/2007 | Kowarz et al. |
| 2007/0188769 A1 | 8/2007 | Rohaly et al. |
| 2007/0195162 A1 | 8/2007 | Graff et al. |
| 2007/0236694 A1 | 10/2007 | Gharib et al. |
| 2008/0031513 A1 | 2/2008 | Hart |
| 2008/0091691 A1 | 4/2008 | Tsuji |
| 2008/0180436 A1 | 7/2008 | Kraver |
| 2008/0201101 A1 | 8/2008 | Hebert et al. |
| 2008/0218604 A1 | 9/2008 | Shikano et al. |
| 2008/0239316 A1 | 10/2008 | Gharib et al. |
| 2008/0259354 A1 | 10/2008 | Gharib et al. |
| 2008/0278570 A1 | 11/2008 | Gharib et al. |
| 2008/0278572 A1 | 11/2008 | Gharib et al. |
| 2008/0278804 A1 | 11/2008 | Gharib et al. |
| 2009/0016642 A1 | 1/2009 | Hart |
| 2009/0129667 A1 | 5/2009 | Ho et al. |
| 2009/0174701 A1* | 7/2009 | Cotter .................. G06T 7/20 345/419 |
| 2009/0238449 A1 | 9/2009 | Zhang et al. |
| 2009/0295908 A1 | 12/2009 | Gharib et al. |
| 2010/0007718 A1 | 1/2010 | Rohaly, Jr. et al. |
| 2010/0094138 A1 | 4/2010 | Gharib et al. |
| 2011/0074932 A1 | 3/2011 | Gharib et al. |
| 2012/0105600 A1* | 5/2012 | Meyer .................. G01N 21/49 348/50 |

FOREIGN PATENT DOCUMENTS

| | | |
|---|---|---|
| JP | 2002-220991 | 8/2002 |
| JP | 2002-254708 | 9/2002 |
| JP | 2003-289293 | 10/2003 |
| JP | 2004-191240 | 7/2004 |
| WO | WO 2007/130122 A2 | 11/2007 |

OTHER PUBLICATIONS

Battle, J., et al., "Recent Progress in Coded Structured Light as a Technique to Solve the Correspondence Problem: A Survey", Pattern Recognition, 1998, vol. 31, No. 7, pp. 963-982.

(56) References Cited

OTHER PUBLICATIONS

Chang, N.L., Efficient Dense Correspondences using Temporally Encoded Light Patterns, IEEE, Oct. 12, 2003.
Dellaert, F., et al., Structure from Motion without Correspondence, Computer Vision & Pattern Recognition, 2000.
El-Hakim S.F., et al., A System for Indoor 3-D Mapping and Virtual Environments, Proceedings of the SPIE, 1997.
Favaro, P., et al., "Observing Shape from Defocused Images", Int'l Journal of Computer Vision, vol. 52, No. 1, 2003, pp. 25-43.
Guarnieri, A., et al., "3D Modeling of Real Artistic Objects with Limited Computers Resources", Proc. of XVIII CIPA Symposium on Architectural & Archaeological Photogrammetry, Oct. 1999.
Hasinoff, S.W, "Variable-Aperture Photography", Graduate Department of Computer Science, University of Toronto, Thesis submitted in 2008, pp. 1-180.
Horn, E., et al., Toward Optimal Structured Light Patterns, 3DIM, 1997.
Horstmeyer, R., et al., "Pupil plane multiplexing for multi-domain imaging sensors", Proc. SPIE 7096, Adaptive Coded Aperture Imaging and Non-Imaging Sensors II, 2008.
Kießling, A.,"A Fast Scanning Method for Three-Dimensional Scenes", IEEE Proceedings $3^{rd}$ International Conference on Pattern Recognition, 1976, pp. 586-589.
Koninckx, T.P., et al., A Graph Cut based Adaptive Structured Light approach for real-time Range Acquisition, 3EDPVT, 2004.
Kordelas, G., et al., State-of-the-art Algorithms for Complete 3D Model Reconstruction, "Engage" Summer School, 2010.
Lepetit, V., et al., "Monocular Model-Based 3D Tracking of Rigid Objects: A Survey", Foundation and Trends in Computer Graphics and Vision, vol. 1, No. 1, 2005, pp. 1-89.
Levenberg, K., "A Method for the Solution of Certain Non-Linear Problems in Least Squares", Quarterly of Applied Mathematics, vol. II, No. 2, Jul. 1944.
Levin, A., et al., "Image and Depth from a Conventional Camera with a Coded Aperture", ACM Transactions on Graphics, vol. 26, No. 3, Jul. 1999, pp. 70-1-70-9.
Li, S.Z., Markov Random Field Models in Computer Vision, Springer-Verlag, 1995.
Lowe, D.G., Three-Dimensional Object Recognition from Single Two-Dimensional Images, Artificial Intelligence, vol. 31, No. 3, Mar. 1987, pp. 355-395.
Lowe, D.G., Object Recognition from Local Scale-Invariant Features, Proc. of the Int'l Conference on Computer Vision, Sep. 1999.
Makadia, A., et al., Fully Automatic Registration of 3D Point Clouds, Proceedings of the 2006 IEEE Computer Society Conference on Computer Vision and Pattern Recognition, 2006.
Marquardt, D.W., An Algorithm for Least-Squares Estimation of Nonlinear Parameters, Journal of the Society for Industrial and Applied Mathematics, vol. 11, No. 2, Jun. 1963, pp. 431-441.
Mouaddib, E., et al., Recent Progress in Structured Light in order to Solve the Correspondence Problem in Stereo Vision, Proceedings of the 1997 IEEE, Apr. 1997.
Neugebauer, P.J., Geometrical Cloning of 3D Objects via Simultaneous Registration of Multiple Range Images, Shape Modeling & Application, Mar. 1997.
Nguyen, V.A., et al., Detection of the depth order of defocused images, Vision Research 45, 2005, pp. 1003-1011.
Pagés, J., et al., "Implementation of a Robust Coded Structured Light Technique for Dynamic 3D Measurements", ICIP, 2003.
Pereira, F., et al., "Two-frame 3D particle tracking", Measurement Science and Technology, vol. 17, 2006, pp. 1680-1692.
Raji, A., et al., "PixelFlex2: A Comprehensive, Automatic, Casually-Aligned Multi-Projector Display", PROCAMS, 2003.
Raskar, R., et al., Multi-Projector Displays Using Camera-Based Registration, IEEE Visualization, 1999.
Rocchini, C., et al., A low cost 3D scanner based on structured light, Computer Graphics Forum (Euroqraphics 2001 Conf. Issue).
Rusinkiewicz, S., et al., Real-Tiime 3D Model Acquisition, ACM Transactions on Graphics, 2002.
Salvi, J., et al., Pattern codification strategies in structured light systems, Pattern Recognition, 2004.
Scharstein, D., et al., A Taxonomy and Evaluation of Dense Two-Frame Stereo Correspondence Algorithms, IJCV, 2002.
Scharstein, D., et al., "High-Accuracy Stereo Depth Maps Using Structured Light", IEEE Computer Society Conf. on Computer Vision and Pattern Recognition, 2003, vol. 1, pp. 195-202.
Sinofsky, "Measurement of Laser Beam Spreading in Biological Tissue Scattering", SPIE, vol. 712, Lasers in Medicine (1986).
Smith, E.R., et al., "Registration of combined range-intensity scans: Initialization through Verification", Computer Vision and Image Understanding, vol. 110, 2008, pp. 226-244.
Subbarao, M., et al., "Analysis of Defocused Image Data for 3D Shape Recovery using a Regularization Technique", SPIE, 1997.
Tardif, J., "Multi-projectors for arbitrary surfaces without explicit calibration and reconstruction", DIM, 2003.
Tardif, J., et al., "A MRF formulation for coded structured light", Proceedings of the $5^{th}$ Int'l Conf. on 3-D Digital Imaging & Modeling, 2005.
Wang, Z., et al., "Extraction of the Corner of Checkerboard image", Proceedings of the 7th World Congress on Intelligent Control and Automation, Jun. 25-27, 2008.
Weisstein, E., Gray Code, http://mathworld.wolfram.com/GrayCode.html.
Willert, C.E., et al., "Three-dimensional particle imaging with a single camera", Experiments in Fluids, vol. 12, 1992, pp. 353-358.
Williams, J.A., et al., "Multiple View 3D Registration: A Review and a New Technique", Systems Man. & Cybernetics, vol. 10, 1999.
Wu, M., et al., "Three-dimensional fluorescent particle tracking at micron-scale using a single Camera", Experiments in Fluids, 2005, pp. 461-465.
Yang, R., et al., PixelFlex: A Reconfigurable Multi-Projector Display System, IEEE Visualization, 2001.
Zhang, S., et al., High-resolution, Real-time 3D Shape Acquisition, IEEE Workshop of real-time 3D sensors & their uses, 2004.
AU, 2008244494 Examiner's First Report, dated Aug. 18, 2010.
EP, 16169525.9 Extended Search Report, dated Nov. 30, 2016.
WO, PCT/US2007/008598 ISR and Written Opinion, dated Apr. 11, 2008.
WO, PCT/US2008/000991 ISR and Written Opinion, dated May 21, 2008.
WO, PCT/US2008/000882 ISR and Written Opinion, dated Mar. 20, 2009.
WO, PCT/US2008/005311 ISR and Written Opinion, dated Sep. 8, 2008.
WO, PCT/US2008/005313 ISR and Written Opinion, dated Sep. 8, 2008.
WO, PCT/US2008/005314 ISR and Written Opinion, dated Sep. 8, 2008.
WO, PCT/US2008/005315 ISR and Written Opinion, dated Sep. 8, 2008.
WO, PCT/US2008/012947 ISR and Written Opinion, dated Jul. 14, 2009.
WO, PCT/US2009/003167 ISR and Written Opinion, dated Oct. 29, 2010.
WO, PCT/US2009/004362 ISR and Written Opinion, dated Apr. 8, 2010.
WO, PCT/US2010/046908 ISR and Written Opinion, dated Apr. 29, 2011.
WO, PCT/US2010/057532 ISR and Written Opinion, dated Oct. 25, 2011.
WO, PCT/US2011/032580 ISR and Written Opinion, dated Jul. 7, 2011.
WO, PCT/US2012/046557 ISR and Written Opinion, dated Oct. 2, 2012.
WO, PCT/US2012/046484 ISR and Written Opinion, dated Sep. 24, 2012.

* cited by examiner

THREE-DIMENSIONAL IMAGING SYSTEM

CROSS-REFERENCE TO RELATED APPLICATIONS

This application is a divisional application of U.S. patent application Ser. No. 13/820,116, filed Feb. 28, 2013, which is a National Phase application of PCT Application No. PCT/US2010/057532, filed Nov. 19, 2010, which claims priority to U.S. Provisional Application No. 61/380,094, filed Sep. 3, 2010, the disclosures of which are incorporated herein by reference in their entireties for all purposes.

BACKGROUND

A number of patents, each including Gharib as an inventor and assigned to California Institute of Technology, cover useful hardware configurations for performing profilometry employing multi-aperture defocusing in connection with a single imager lens and one or more cameras/imagers. These patents include U.S. Pat. Nos. 6,278,847; 7,006,132; 7,612,869 and 7,612,870—all of which are licensed by the assignee hereof and incorporated by reference herein in their entireties. Defocusing principles in which two-dimensional scan data is employed to generate three-dimensional coordinate information can be appreciated in reference to these patents. Further-improved hardware for applying these defocusing principles is described herein.

Irrespective of such hardware improvements, keen positional information is required to aggregate the three dimensional information determined through defocusing in order to map the surface of an object. Such positional information—often referred to as the camera "pose"—may be obtained in different ways. U.S. Pat. No. 7,605,817 to Zhang (assigned to 3M) describes one approach and U.S. Publication No. 2009/0295908 to Gharib (assigned to California Institute of Technology) describes another. Neither approach offers the benefits of the pose techniques described herein.

SUMMARY

Accordingly, hardware and software configurations, optionally, for performing profilometry of an object are disclosed. An advantageous imaging device (i.e., imager, camera or scanner) is described. An advantageous approach to determining imager position is also described. While advantageously used together, each aspect described may be used independently of the other. Moreover, the teaching may find use in other fields including velocimetry, etc.

Three-dimensional information may be obtained using a hand-held imager/camera/scanner. Sometimes the subject to be scanned is larger than the field of view of the scanner and/or the subject is scanned from different vantage points. To capture such information, the pose of the scanner device changes at different times. A combined or aggregated image scene may then be prepared in connection with determining camera pose on a spatially-related basis across any number of image scenes. Given the fidelity of the camera pose determination, it is hereinafter referred to as the "True Pose" of the camera.

This implementation for determining camera position operates by comparing scenes for which information has already been determined indicating the scenes are potentially matchable. (Wherein the matching may be carried out through various techniques including cross correlation, least mean squares, super-resolution PIV or as including warping/dewarping approach as further elaborated upon below). The determination of True Pose for a final or actual (i.e., for the purpose of combining data sets for system output) camera position is performed in a post-processing setting after image capture.

Scenes are indicated as potentially matchable based on a roughly-accurate camera position determination (i.e., a "Rough Pose") performed during image capture (i.e., as in "real time"). Processing and other action conducted in "real time" is performed such that a user does not recognize a lag in system performance. When possible, the Rough Pose is generated by matching (as above) data sets based given Tentative Pose information.

Initial camera position information (i.e., the "Tentative Pose") to be used in determining the Rough Pose (and no longer relied upon) can be generated in a number of ways. Generally, Tentative Pose is found employing a robust process. One approach is to use the standard technique of comparing a reduced data set of easily recognizable features derived from one frame to a reduced data set of easily recognizable features from a/the subsequent frame. See, e.g., U.S. Patent Publication No. 2008/0201101 at 0010 (describing the state of the state of the art prior to the application priority date). However, such an approach can be altered and augmented by comparing such features in a current frame from those accumulated or aggregated from previous (e.g., 20 to 100) frames.

In any case, the Tentative Pose is not itself used in the methods described in any manner for combining the subject data to produce the scanner output. Its resolution falls far short of the requirements of the present system to deliver a workable image file output as desired for dental crown production and/or other high-precision profilometry applications. However, in some circumstances, the Tentative Pose data may stand-in for the Rough Pose data in carrying out True Pose determination through spatial/global matching.

To use an analogy, the Tentative Pose provides location data akin to indicating the state for United States postal delivery. Closer position—akin to calling out the zip code of a region—is determined through the Rough Pose procedure. True Pose—akin to a particular PO Box location—is, alone, used to provide the final deliverable.

Using True Pose for image aggregation thus avoids the error stack-up and data/package loss associated with imprecise address information. Using the Tentative or Rough Pose makes finding the True Pose computationally feasible (this is especially so when employing Rough Pose in longer scans—as in a scan of a complete jaw—for which the enhancement in Rough Pose spatial accuracy is more evident).

More directly, "Tentative Pose" is positional information used for the time-being, but is quite uncertain and preliminary. The "Rough Pose" is still uncertain, but more accurate—roughly accurate—in terms of describing camera position. The "True Pose" is the camera position determination that is accurate to the degree required to meet the system specifications for the intended purpose. As an example, this accuracy is such that it can deliver a profilometry output file with the following specification: an RMS error for a single tooth about 35 microns or better, and an RMS error for 3 teeth of about 40 microns or better.

In delivering such results, the inventors hereof have discovered that it is important to refine the Tentative Pose to generate Rough Pose, when possible, for further use in determining True Pose because reliance on sequential/timewise generated positional information (i.e., Tentative Pose) results in a stacking or build-up of error. When scanning a significant/relevant region (as in scans for dental crown production) the error generated can be too great to accurately aggregate information to produce a relevant model.

Another aspect considered herein is the manner of performing the matching itself. Various techniques are employed. These include a cross-correlation technique as described below, as well as optionally incorporating a rotational element in an overall "Pose-Based Matching" process. The rotation of one frame to more closely match another with a somewhat-known (i.e., tentatively or roughly know) spatial relation allows for cross-correlation that could not otherwise occur.

As for the advantageous hardware implementation, it employs a single lens with multiple apertures as do the referenced approaches. A preferred embodiment, employs the different color channels of a commercially available sensor to capture different wavelengths of light (optionally emitted by single-color light sources such as LEDs) with simplified hardware. As such, no additional beam splitters, alignment controllers with lock-downs or other cumbersome hardware is required, thereby allowing production of a highly compact and robust (against shock, thermal cycling, etc.) imager handpiece.

The present invention includes the subject devices and methods including the hardware and software embodying the same. More detailed discussion is presented in connection with the figures below.

This filing claims the benefit of U.S. Provisional Patent Application No. 61/380,094 filed Sep. 3, 2010 and entitled, "Three-Dimensional Image System with Multiple Determinations," which application incorporated by reference herein in its entirety.

BRIEF DESCRIPTION OF THE DRAWINGS

The figures provided herein are not necessarily drawn to scale, with some components and features exaggerated for clarity. Variations of the invention from the embodiments pictured are contemplated. Accordingly, depiction of aspects and elements of the invention in the figures are not intended to limit the scope of the invention.

DETAILED DESCRIPTION

Various exemplary embodiments of the invention are described below. Reference is made to these examples in a non-limiting sense. They are provided to illustrate more broadly applicable aspects of the present invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Such modifications are intended to be within the scope of the claims made herein.

Imaging Hardware

Figure 1A:
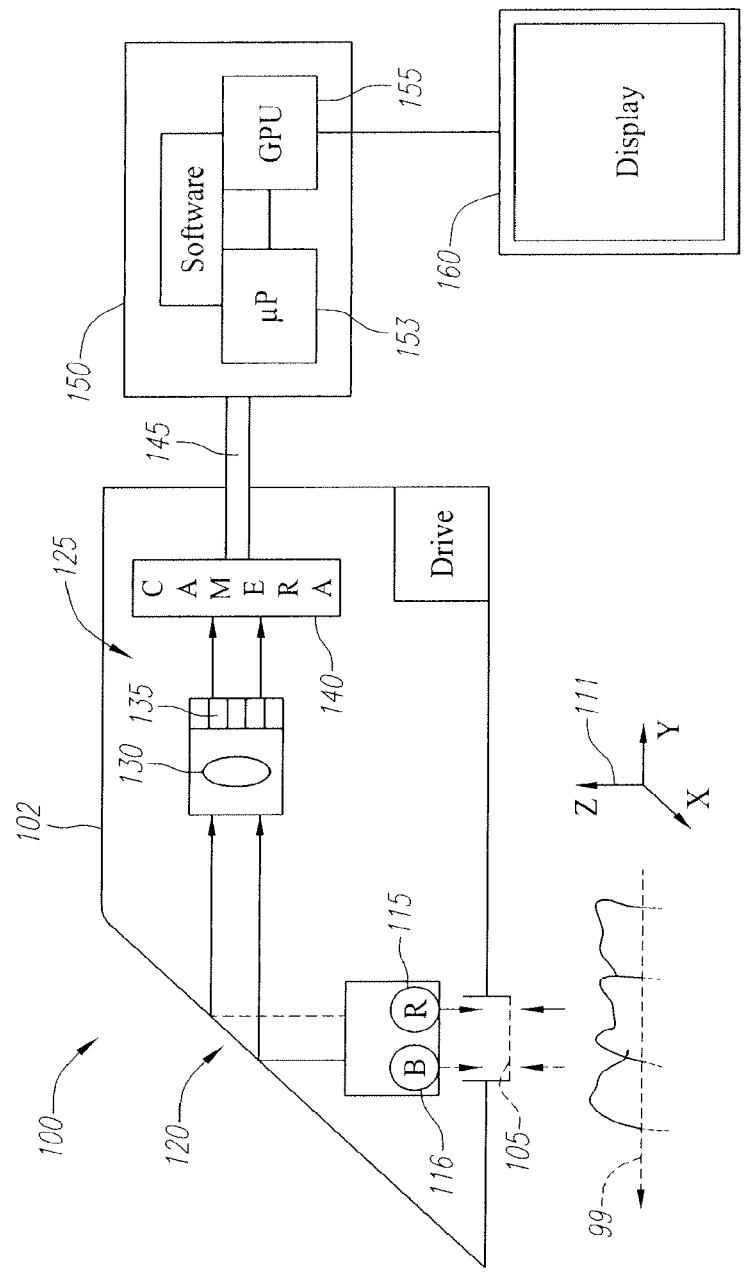
FIG. 1A shows a block diagram of the hardware of an embodiment and FIG. 1B illustrates filter characteristics associated with a commercially available color sensor.

FIG. 1A shows a block diagram of a hardware embodiment. A hand-held scanner 100 is used to image an object 99. The scanner 100 has an outer housing 102 which holds a number of optical and electrical items. The scanner can include any type of camera 140 or any other device which receives optical information and converts that optical information into electrical information. For example, this may include a CCD camera, CMOS image sensor, or any other kind of photosensor that converts light photons into electrical signals. The camera 140 produces output information indicative of one or both of two dimensional information and/or three-dimensional information. The two-dimensional information may be referred to as x and y coordinates, defined as coordinates that are perpendicular to a z axis direction 111 between the imaging device and the object being imaged. The third dimensional information may include z-axis coordinates that are orthogonal to the x and y coordinates and are indicative of the distance between the camera 110 and the object being imaged. As conventional, the axes can also be tilted and/or reversed, as there is not intent to limit to this specific coordinate layout.

The image information may be stored as x, y and z coordinates or may be stored in any other form, such as a three-dimensional point cloud, a three-dimensional mesh, or any other form that can represent two-dimensional and/or three-dimensional information.

A window 105 is formed in the portion of the scanner 100 which allows scanning of three-dimensional objects 99. In an embodiment, this may be used for scanning dental objects such as teeth, to form a map of the teeth. While the embodiment describes scanning teeth, the imaged object 99 may be any object, collection of objects, portion of an object, or other subject matter. For example, in a dental imaging application, the object 99 may include a tooth, a quadrant of teeth, or a full collection of teeth from which a virtual dental impression is desired. In other embodiments, the object may be some other medical subject, e.g., an eye, nose, head, ear, or other.

An illuminator comprising different color light elements 115, 116 provides light onto the teeth 99. The image of the illuminated object is also received through the window 105. A corner mirror 120 reflects the received radiation to an optical system 125. In other embodiments, the system may operate without a corner mirror.

The optical system may include a lens 130, and a mask with multiple apertures 135. The apertures 135 may be color coded, that is one aperture may pass only or predominately a blue color and the other may pass only the light through which has a red color. The illumination 115, 116 may provide colors that match the colors of the mask, here blue illumination from 115 and red illumination from 116. This produces two different channels of information, one through each of the two apertures. The processing described herein distinguishes between these two different channels to obtain different information from the two channels.

The light through the apertures 135 is provided to an electronic camera 140 that produces electronic outputs indicative of the light received through the apertures. The camera is connected by a cable 145 to a computing device

150 that includes software for driving the camera and analyzing the information. The wires 145 may include power for driving the camera, and may also receive information from the camera.

The computing device 150 can be a general purpose processor with a microprocessor 153 operating according to a stored program that is described according to the techniques of the present application. The computing device may also or alternatively include a graphics processing unit, or GPU 155, e.g., in a video card that drives a display 160. The GPU 155, for example, can be an ATI or a Nvidia video card. The computing device may also or alternatively include a field programmable memory, (e.g., a gate array) or any custom hardware or custom logic.

In one embodiment, the portable hand-held scanner in FIG. 1A can be moved, while still obtaining information about the scanned area. As the camera moves at each of the plurality of different times, new information about that new camera position is obtained. This allows the overall object 99 that is finally imaged to be larger than the window 105.

The camera 140 may be a standard color camera (e.g., ⅓-Inch SOC Megapixel CMOS Digital Image Sensor as produced by Micron Technology, Inc.) that uses a color filter array that is already part of an image sensor within the camera 140 to separate the colors. The filters on the color filter array portion of the camera 140 separate between the color rays (here red and blue channels) to obtain the information and to distinguish between the color rays passed by the color filters on apertures 135. The information from each colored filtered aperture is picked-up only by the appropriate filter portion of the camera 140.

The color filter array can be a Bayer filter such as described in U.S. Pat. No. 3,971,065 or alternatively can be a different kind of color filtering such as the CYGM filter and the RGBE filter or a custom filter array (e.g., if there are two apertures which are coded as blue and red the filter array would have alternating filters of blue and red). A camera incorporating a custom two-color filter would have the advantage of using all of the available sensor area in connection with a two-color two-aperture system.

In use of such a standard imager, however, only two (R, B) of the three channel colors (RGB) available are used. This means that part of the real estate of the photosensor is in essence wasted: the area where the non-used color is located. In theory, such an approach reduces the dynamic range of the system by a ratio equivalent to the amount of the photosensor surface that cannot be used. With a conventional Bayer filter, this amounts to roughly half the sensor area.

Figure 1B:
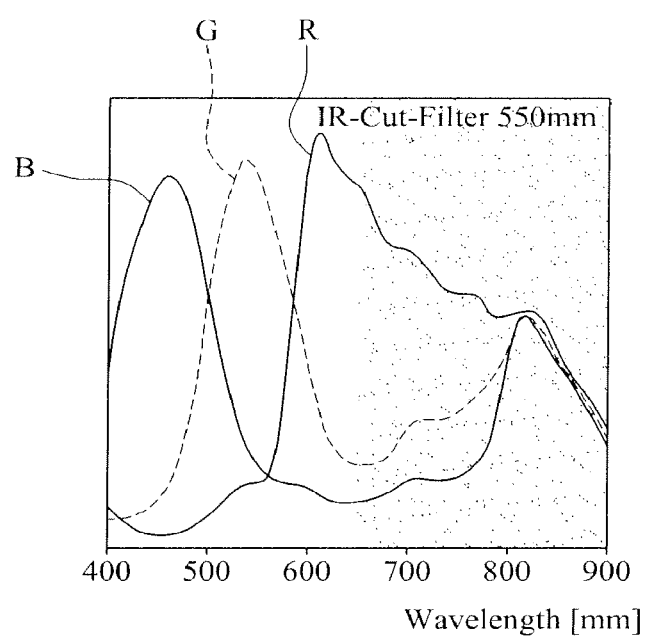

Surprisingly, such an approach is none-the-less advantageously implemented. The conventional concern of recording a sub-optimal data set does not problematically hinder system utility. Indeed, by selecting red and blue channels only, less noise is introduced from a processing standpoint than if a third green-coded aperture and green channel recorded. This fact is illustrated in reference to FIG. 1B. Namely, the separation of the red (R) and blue (B) filters illustrated for the sensor essentially ensures (for a given intensity cutoff or threshold) that light passed through the red-coded aperture is only recorded on the red channel of the sensor and vice versa for blue. If a green channel were introduced, the light from the green aperture would be more readily absorbed by each of the red and blue sensor channels and the green sensor channel (G) would more readily absorb (again, at a given threshold) light from each of the red and blue coded apertures due to transmission spectrum overlap.

It has been discovered that avoiding such "cross-talk" for the sake of cleaner sensor data more than compensates for the (effective) reduction in pixel count. Essentially, the sub-selection of channels enables producing a high quality image system with low cost (because they are available off-the-shelf) sensor components.

While the inventive hardware aspects focus on the above, it is to be understood that the inventive software and associated methodology may employ different numbers of apertures and/or colors. In either case, composite colors (such as amber or white) can be employed even though discreetly colored emitters are discussed above. Notably, dropping the green channel out of use to achieve further separation between the color channels that are ultimately used may have even more pronounced benefits in this last scenario.

Defocusing

As generally referred to herein, a number of references (including patents noted to Gharib) discuss the "defocusing" concept. In the broadest sense, "defocusing" involves imaging through a plurality of pin-hole camera type apertures of a known spatial relation. The apertures restrict the image received by a camera sensor system. Whether using a single sensor or multiple coordinated sensors, differences in x, y coordinates of features identified from the images received through each aperture are compared to determine z-coordinate values for those features.

Scalar differences between features recorded at one distance from a scanned object are compared to those at another distance. For example, the difference between resultant triangular patterns imaged through a triangular arrangement of apertures is used to determine the z-axis differences. Further, a calibration set can be used to improve the accuracy of the results. By imaging a known grid pattern, and storing a calibration table, nonlinearities of the recorded image data can be accounted for by "dewarping" the image feature positions.

Margin Definition

In scanning an irregular body (e.g., one or more teeth) to produce a three-dimensional data output file (e.g., an STL file for use in crown manufacturing) it is useful to define a boundary up to which three-dimensional scan data is populated. Such a boundary (or "margin") definition can be helpful for defining the extent to which a user is directed to concentrate scanning activity on an area to generate a full scan. Also, in some instance in which scanning is not complete, but a margin has been defined, an approximation of the unscanned area can instead be filled-in by interpolation. Still further, a well-defined boundary helps in point outlier filtering (i.e., points outside of the view of the margin are not considered in the calculation of the surface inside).

User definition of a margin offers certain benefits. When performed by drawing a line or line segments digitally (using a wand, touch screen interface or other means) over a digital representation of the object that is being scanned or has been scanned, the user can make judgment calls based on observation and experience. Utilizing the human capacity in this manner may help avoid the need to implant costly or cumbersome programming and/or introducing error that the qualitative "eye" of a user can otherwise avoid.

In the approach to user-produced margin definition described above, x and y coordinate information is recorded in the reference plane of the screen. In doing so, line(s) or a curve is drawn by a user upon the image of the body (scanned or to be scanned) displayed. So each (say, blue channel) x,y point in this plane intersects with multiple potential z values. Then, in connection with the dense point cloud/set information from scanning and the calibration set, true x,y,z can be determined. Accordingly, the activity generates a three-dimensional feature based upon user-input two-dimensional information.

Image Determination Software Overview

Figure 2:
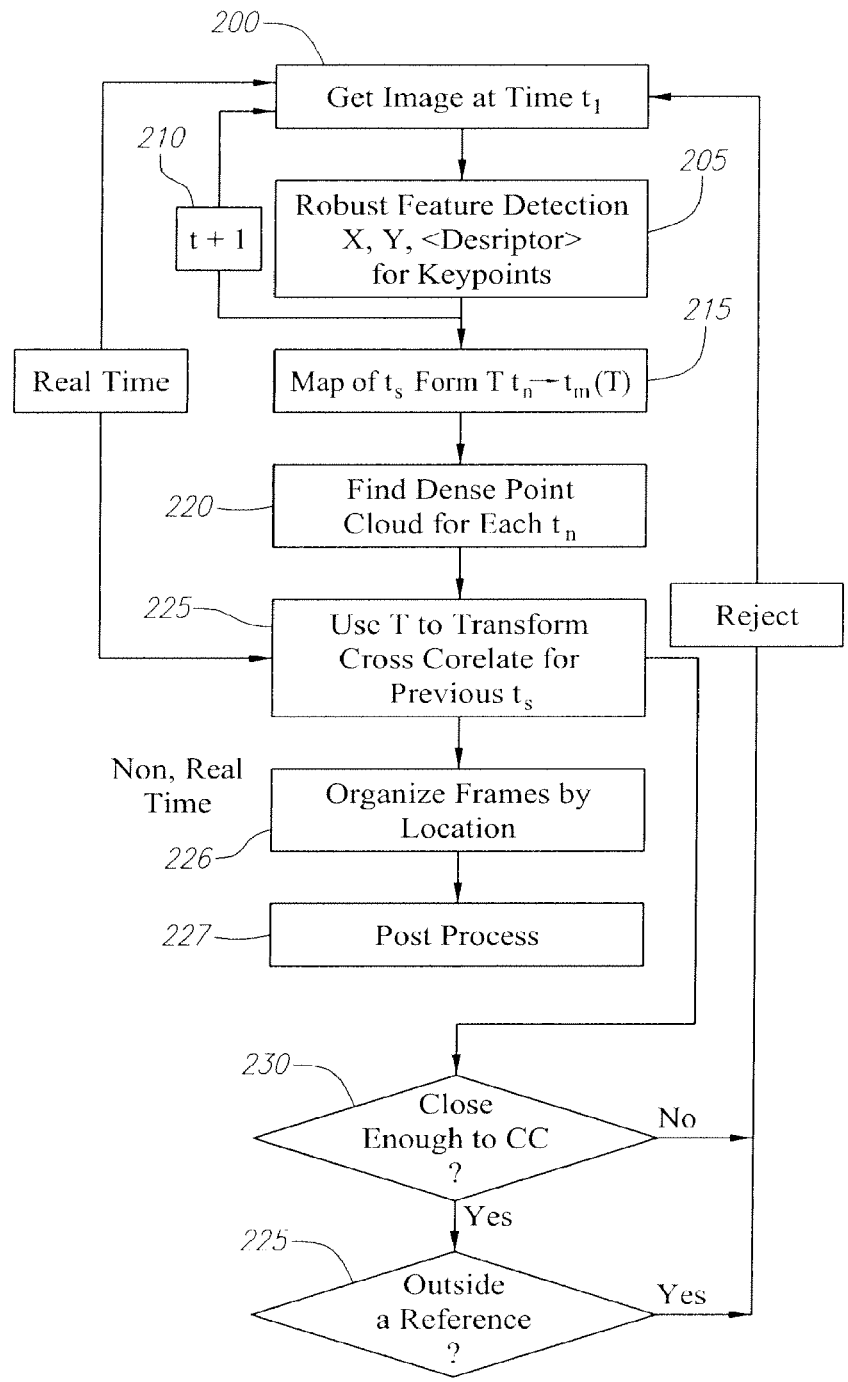
FIG. 2 shows a summary flowchart.

FIG. 2 shows a general flowchart of the operation of image determination and processing. At 200, the system obtains image information at a first time t1.

In an embodiment, this information is a capture of multiple images through multiple apertures, in a way that allows distinguishing between the apertures. In the embodiment illustrated above, color filters are used to separate between the channels. One of the apertures can be associated with a red filter to only or predominately pass the red light, with the other aperture can be associated with a blue filter to only or predominately pass the blue light. This approach forms two channels of information, one having passed through each of two separated apertures. According to another embodiment, rather than separating the channels by colors, the apertures are arranged in a specified arrangement such as an equilateral triangle, and the processor 153 recognizes that equilateral triangle in the final image to find the image parts attributable to the apertures. According to another embodiment, the different channels can be formed by modifying polarizations of different channels, by putting different polarizations on the different apertures and camera sensors, thereby using polarizations on both the apertures and on the camera. This embodiment uses those different polarizations as the different channels. The channels can be formed in different ways by providing different physical mask shapes (shaped apertures), or by time division changing the aperture (e.g. by moving it from place to place).

Regardless of the implementation, at 205, a robust feature detector (e.g., the robust feature detector can use the off-the-shelf "SIFT" software or a simply-implemented custom software) is used to determine references on the current image frame using a reduced data set—in this example—from the blue channel. Note that the image frame obtained at any one time will be smaller than the overall image frame. The references are referred to herein as being "keypoints," but any reference that can be recognized in different images can be used. The robust feature detector finds two-dimensional information (x, y) of the position of the keypoints as well as a feature vector style descriptor for those keypoints. That feature vector style descriptor will stay constant at any scale rotation and lighting for the points.

The feature vector style descriptor can be obtained by extracting interesting points on the object to provide a "feature description" of the object. This description has enough information that can be used to identify the object when attempting to locate the object in other images containing other objects and/or from when imaging from different view/vantage points. The features extracted from the training image are selected to be robust to changes in image scale, noise, illumination, and local geometric distortion to perform reliable recognition. This may use techniques, for example, described in U.S. Pat. No. 6,711,293. The commercially available scale invariant feature transform (SIFT) software can be used for this detection. Three dimensional point information for each of the keypoints is also determined using defocusing principles and equations of the type described herein and described in U.S. Pat. Nos. 6,278,847 and 7,006,132.

At 210, the next frame is obtained, where the next frame can be frame number 2 at time t2. In general, the frames can be incremented to get the next frame.

At 215 a Tentative Pose map is formed of the different ts. It matches the different parts of the three dimensional information corresponding to the keypoints in order to obtain a transformation T (translation and rotation) between the t's. This represents a transformation between a core time t, and any other times tn, which can include multiple ns, e.g., ($t_{n1}$, $t_{n2}$ . . . ) via the combined information.

At 220, a dense point cloud for each obtained frame tn is obtained. The dense point cloud can obtain three-dimensional image information using defocusing applying the techniques described above. The finding of the dense set (the points and their positions) and the identification of robust features can be determined in parallel. The finding of the 3D coordinates of the robust features may be done after other information has already been determined.

At 225, the linear transformation T associated with the Tentative Pose between the different times is used to transform and/or cross correlate between the 16×16 pixel windows of the images that surround dense point clouds obtained at the different times to obtain a Rough Pose. This is done by either cross correlating a current dense point set (e.g., a 16×16 pixel window around a central point) with a previous dense point set, or by using robust feature detection on a sparse point set (e.g., the blue channel) to match to a previous set of frames to find a match. At 225, therefore, the 3D information, and the Rough Pose have both been obtained.

Based on that Rough Pose, at 230 it is determined if the current information is close enough to a reference frame to cross correlate the two frames. If so, then cross correlation is carried out. If no frames are close enough, then the current frame is rejected. If the current information is close enough to the reference frame to cross correlate the two frames but the new frame is outside some threshold distance at 235, it is also rejected but added as a new reference frame. A pose recovery operation may then be used to establish or refine the Tentative Pose.

In operation, the processor is programmed to process a point collection along with the defocusing equations to obtain a 3-D image. The red and blue channels are cross correlated with a multi-grid as described herein. At 226 the frames are organized by location.

At 227, the transformation information representing the Rough Pose of the scanner is determined through post processing in order to obtain different and more accurate information positional information (i.e., the "True Pose"). The post processing may use a less robust but more accurate technique than employed for either of the previous pose determinations. For example, less robust techniques may make it more computationally expensive to match pixel differences more than a certain amount, but may provide more information about that matching.

The inventors found that cross correlation techniques may be extremely robust, and may provide very accurate values between the different transformations. However, it is not computationally feasible to use this more robust technique to recover poses that have large pixel shift between poses (thus the value of using the Rough Pose vs. the purely Tentative Pose). Using current Nvidia GPUs, more than 64 or 128 pixels of shift between the poses would not be computationally feasible in real time.

The post processing at 227 recognizes that once these frames are "transformed" to have shifted so that there is less pixel shift, a more accurate technique can be used for post processing. Accordingly, in an embodiment, steps 200-225 are carried out in real time, and 226 and 227 in non-real time, after the real time Rough Pose has been calculated. The first part of the operation thus calculates the Tentative Pose and Rough Pose in real time, while the next parts refine those pose estimates.

Cross Correlation

Figure 4A:
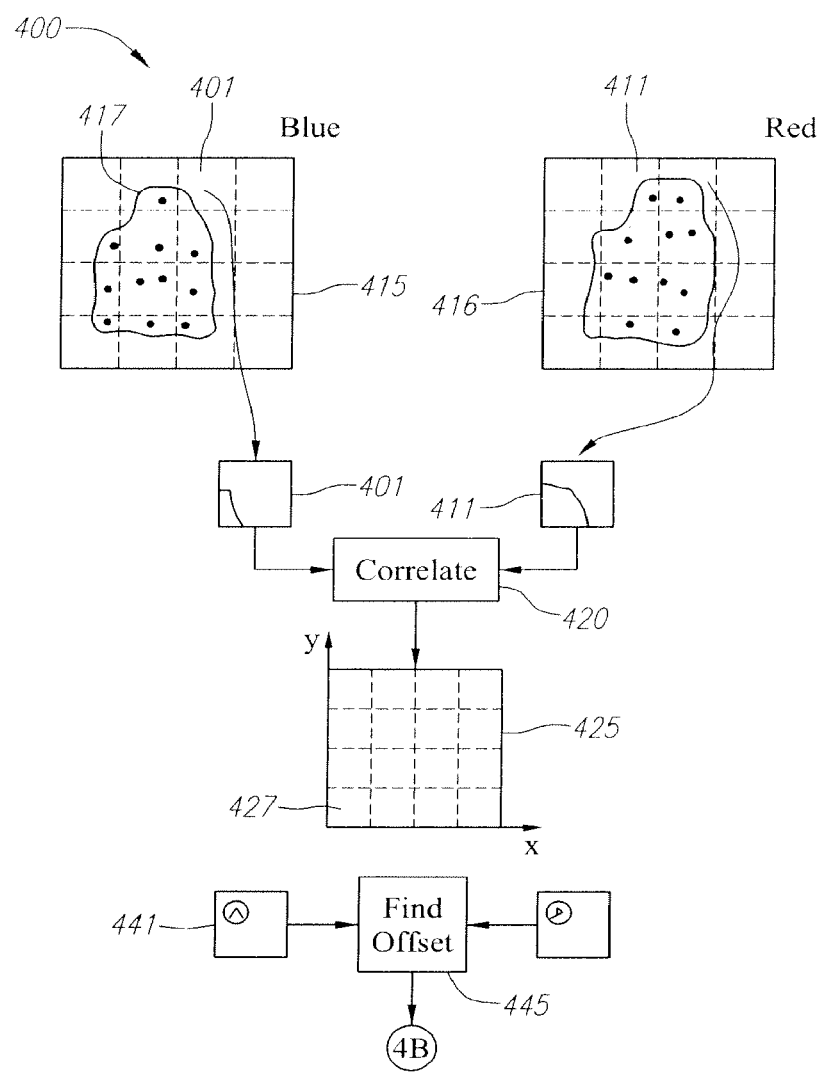
FIGS. 4A and 4B detail cross-correlation matching.

The cross-correlation or "CC" operation referenced throughout the specification is illustrated in FIG. 4A. This may be a robust cross-correlation operation (e.g., when using robust features) or it may be used to match point cloud data. The operations of FIG. 4A may be carried out, for example, in a processor such as the microprocessor 153 or GPU 155.

Item 400 is shown at a first time/pose in 415, and at a second time/pose in 416. The different times/poses can be different color channels of the same frame, for example, or can use other channel separating techniques. The points can be natural points, or can be applied, for example, by a fixed illuminator, or can be applied using a contrast agent. This can also investigate arbitrary locations that are areas of the surface that have a certain brightness, contrast or look.

Each frame 415, 416 is subdivided into a number of subdivisions such as 401. Subdivision 401 in 415 is shown compared with another of the subdivisions 411 in 416. These two subdivisions 401/411 are shown as being compared in FIG. 4A, but it should be understood that this operation is carried out for each of a plurality of subdivisions.

At 420, the two subdivisions 401, 411 are correlated. Each correlation represents a number of different shifts of the image. Each correlation creates a correlation image at 425 which includes a number of pixels. Each pixel in the correlation image represents the result of one correlation shift. For example, cross correlating 401 and 411 gives a single cc image 425 representing all the shifts. Note that the cross correlation technique used can be any kind of cross correlation type, including circular, zero padded, fast fourier transform (FFT) based, or any other kind.

For example, the pixel 427 represents a pixel which is shifted in the x direction by zero but shifted down (in the y direction) by three. Each pixel value in the correlation image represents one whole shift and one whole multiplication by the amount in the location of the pixel in the correlation image. Each of these values can be calculated, for example, in shaders of the GPU or in a processor, or in dedicated logic such as gate arrays or custom hardware.

The brightest pixel in the correlation plane is found. This is done by investigating the pixels and the surrounding pixels are used to find the sub pixel location of the peak. Any of a number of different peak fitting techniques can be used in this way. A most common peak fitting assumes a Gaussian shape.

Figure 4B:
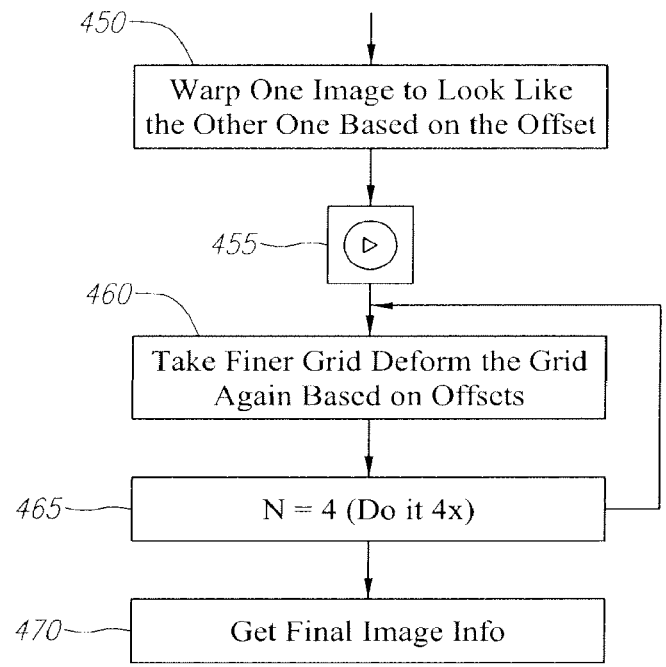
Figure 4C:
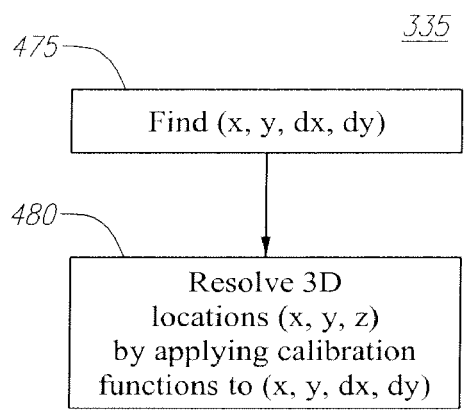
FIG. 4C is a flowchart illustrating 3-D point location determination.

Subpixel Gaussian peak fitting can be used. FIG. 4B shows how this technique is used to find the correspondence of a grid of points in the blue channel to their corresponding points in the second channel.

At 445, the brightest pixel in the grid of correlation images represents the location of best match between the images. This match is used to represent the offsets between the images. Bicubic splines can be used to interpolate between grid points.

At 450, the set of coarse offsets has been found (at 445). One of the images (e.g., the red) is then warped at 450 to look like the other image (e.g., the blue) based on the offset. This creates a composite image 455.

At 460, the images have been warped to be closer to one another. A finer subdivision grid is obtained. The correlation operations 420, 425 are then repeated to get a new warp between images for the finer grid.

A new grid is then formed again, representing a finer subdivision. This procedure is done some number of times (e.g., 4), reflecting the desired accuracy balanced with the computational accuracy available at 465 in the embodiment. Or the iterations may continue for some other number of iterations (e.g., until reaching a 16×16 pixel size). At this point, 470, the final image information obtained. It includes x,y (or "bx, by" expressed as the location information for the blue channel information) and dx, dy (the shift in position between the blue and red channel) 3-D POINT LOCATION RESOLUTION In one embodiment, 3-D point clouds are generated (per 325 in FIG. 3A) in connection with the cross-correlation technique. In general, cross-correlation is employed between the blue and red channels to find numerous corresponding image pixels between these channels. With point location information obtained through cross-correlation (e.g., as per above), corresponding 3-D point locations can be obtained in connection with the scanner calibration information.

For a calibration procedure, an initial operation is carried out to define a calibration set or table based on a calibration grid. More specifically, for a calibration grid imaged at each of a plurality of "z values", a value in the blue channel is compared to the value in the red channel. For example, the location 0,0 in the blue channel will have a corresponding location in the red channel. This calibration set/table represents an offset from the blue channel to the red channel.

These offsets dx and dy (which are offsets to the red channel) are known at 475. For each value, a translation to the x,y,z position is also known from the calibration procedure. Therefore, for any bx, by (i.e., x and y in the blue channel) and dx, dy a corresponding x, y, z value can be determined using the calibration table by applying linear algebra. Stated otherwise, with (bx, by, dx, dy) the z can be determined tracking back through the deformations used to match the blue and red images per 480 in FIG. 4B.

Namely, in FIG. 4B, each warping/deformation iteration (450-465) represents a difference from the previous image to the next deformation. These deformations are added to one another to obtain final image information at 470 (optionally expressed in terms of x, y, dx, dy). At 480, the calibration set is used as a function applied to this information to obtain x, y and z position information in defining the dense point cloud. Accuracy is thereby improved by reducing from four dimensions to three dimensions using the calibration information that is individual for the specific camera.

Pose Based Warping

The cross-correlation technique also offers a tool in connection with a "Project Planes" feature. "Pose Based Warping" may be regarded as the action of Projecting Planes and then Cross-Correlating.

When images cannot be directly cross-correlated because of gross movement (e.g., large in/out of plane rotation and/or translation), it becomes computationally infeasible to recover the pose using cross correlation or other similar image matching algorithms. With some knowledge of R and T (e.g., Tentative or Rough Pose depending on the point of implementation in the current method) cross correlation is possible after adjusting one of the images to be cross-correlated even when the offset is larger than 64 pixels.

Figure 8:
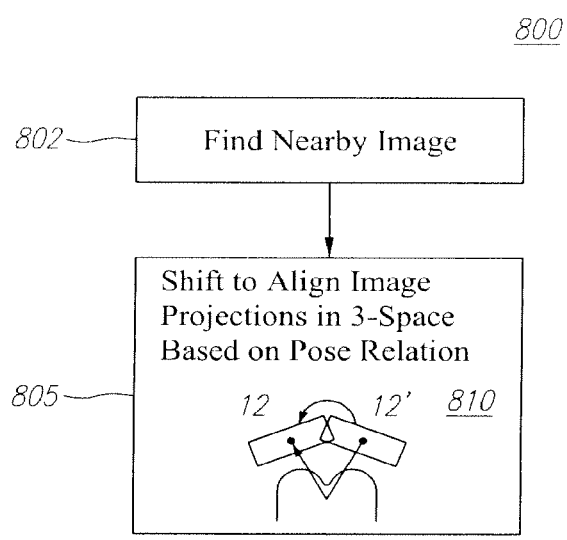
FIG. 8 illustrates frame finding and translating in the process of pose based warping as referenced in FIGS. 3C and 7.

The Project Planes feature used to carry out the adjustment is described in connection with FIG. 8. At 800, close-by vectors are identified. At 802, vectors that are as distant as possible are identified for cross-correlation. At 805, one frame is shifted (translated/rotated) based on less-refined pose information to look like the other frame en route to determining more-refined pose information.

More specifically, for first and second images (I1, I2) an Image I2' is generated as a prediction of what I2 will look like in the plane of I1. So, taking a representative point in I2', it is translated and rotated (i.e., projected) in 3-space (using the calibration set, available pose information and dense point cloud information) to find its position in I2. For all of the integer points considered f(x,y) represents such activity as a continuous function.

Ultimately, the Project Planes operation in Pose Based warping optionally used in determining Rough and True Pose has the goal of creating data from multiple different images that look more like one another for cross-correlation. For example, looking at FIG. 6, different poses of the camera may be looking at the same item and even the same place on the item, but from different viewpoints. For example, image 1 at pose 1 (R1, T1) may have been found as 650. Image 2 at pose 2 (R2, T2), however, may have been found at 652. While these may both be looking at the same actual item, 650 may look as shown in 651, while 652 looks as shown in 653. At this point, these values may be too different and far apart to cross correlate.

Figure 9:
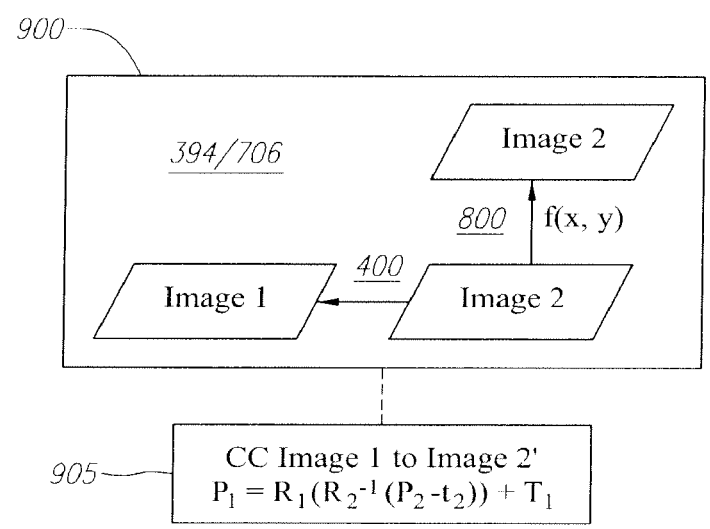
FIG. 9 functionally details the technique of pose-based warping.

Per FIG. 9, a function f(x,y) is used to map Image 2' into Image 2, where Image 2' has similar pose parameters to Image 1 (as represented in the Project Planes process 800). Then, through a cross-correlation process 400, flowchart element 900 finds the function that warps Image 2' into the coordinate system of Image 1, to provide Image 1 and Image 2' both in the same coordinate system.

In notation per element 905, in cross correlating image 1 to image 2', image 2' has already been inverted, so no inverses need to be found for this function. This creates a simplified warp. Such a warp assumes that all of the Z values are zero.

Since this is typically not the case, however, the calculation of f(x,y) at 900 can also account for the differing z-axis depth by fitting a least squares plane to the transformation f(x,y)->(x', y', z'), where $$x'_i = a_x x_i + b_x y_i + c_x$$

$$y'_i = a_y x_i + b_y y_i + c_y$$

$$z'_i = \ldots$$

This can be written in matrix form.

The shape can then be smoothed by creating a new grid of points using the new x,y,z correspondence. The new grid of points creates a relationship between f(x,y) and (x,y,z) based on spline ("Sp") interpretation. This uses the relationship $$(x,y) \to x\ Spx$$

$$(x,y) \to y\ Spy$$

$$(x,y) \to z\ Spz$$

therefore, the plane maps to a 3-D smoothed spline.

As referenced above, using the calibration set obtained for the camera, the points for the blue channel can be converted to x,y,z. The transformation is not a completely linear function, since the pose changes the magnification as x,y and z change. By calculating these values in a matrix form, the amount of nonlinearity can be compensated in this way.

Image Capture and Real-Time Pose Determination Details

Figure 3A:
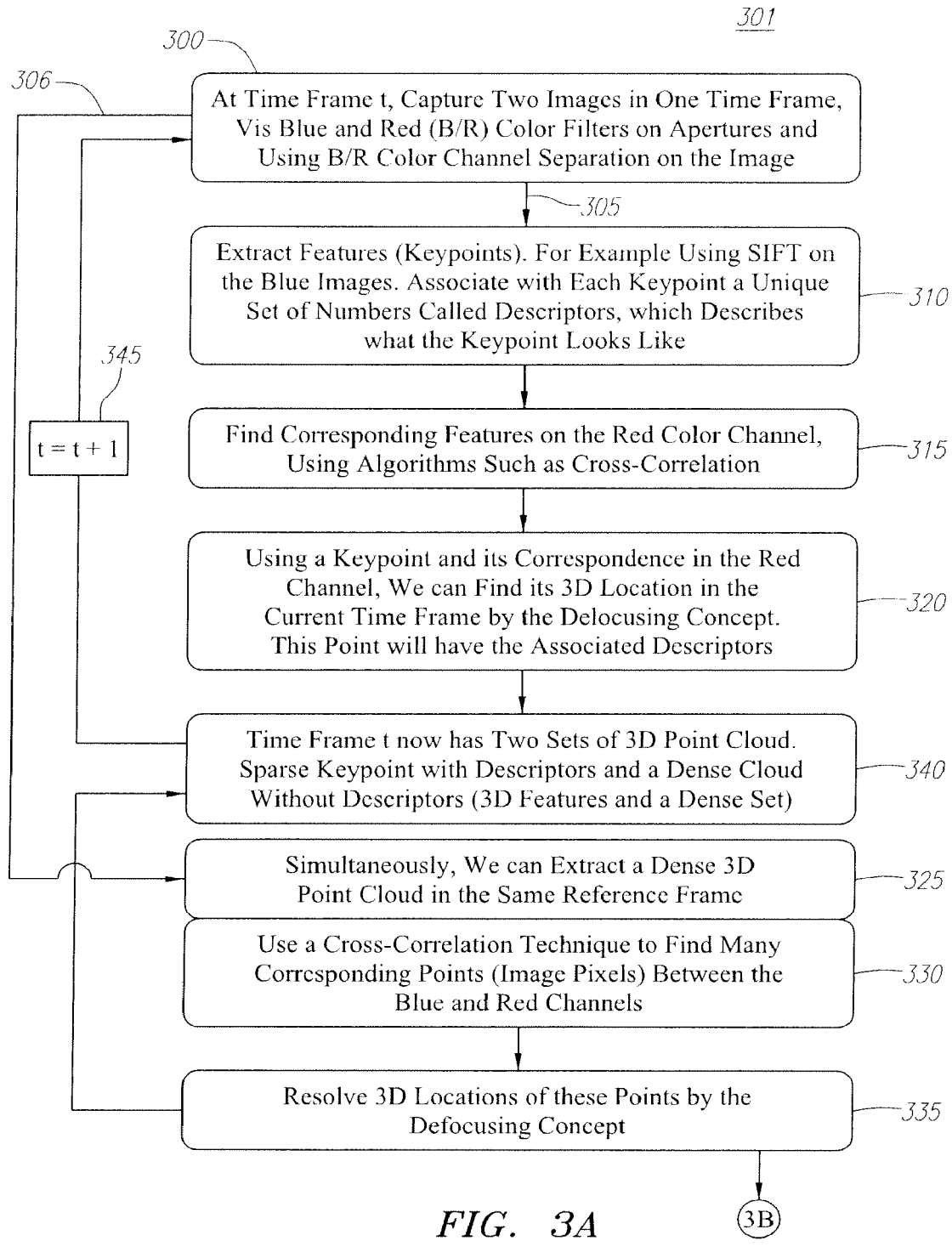
FIGS. 3A-3C shows a more detailed flowchart of the real-time activity in FIG. 2.
Figure 3B:
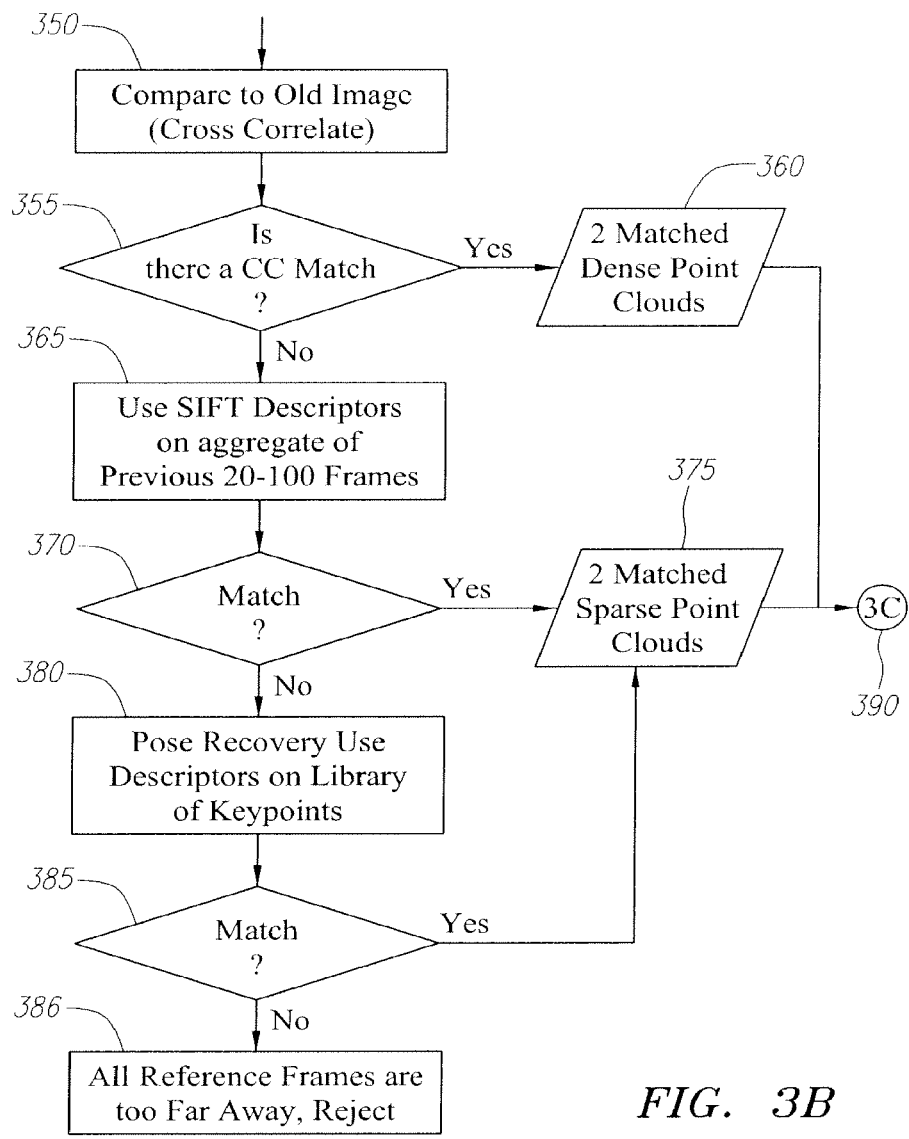
Figure 3C:
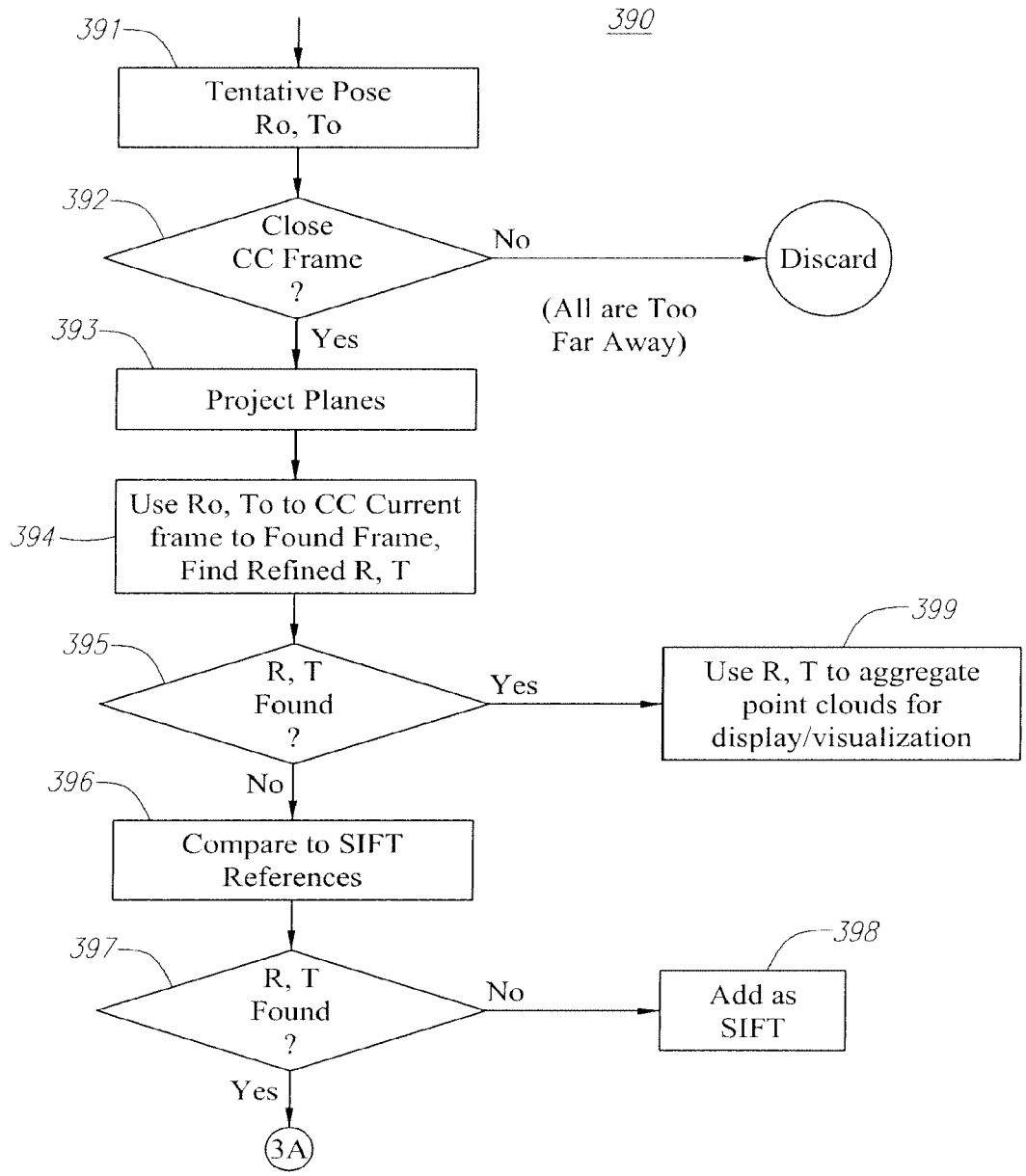

FIGS. 3A-3C define a flowchart or real-time activity in an implementation of a program that is run on the processor 153 and/or GPU 155. At 300, at a time frame t0, the system captures two images in that one time frame t0. These two images form the two channels which are used herein. After obtaining the two images (color-coded in this case), two parallel paths 305 and 306 of processing are carried out. The path 305 is used (as per FIG. 3B) to determine camera pose and to carry out a coarse determination of the camera information and hence find preliminary translation information (i.e., the Tentative Pose). Path 306 is used to determine dense 3-D information. While this application describes these as being carried out in parallel, it should be understood that these computations can be carried out at any time.

At 310, keypoints are obtained using a more robust but less accurate technique such as the scale invariant feature transform "SIFT" software or other means as noted above. In any case, a feature vector descriptor is typically determined for each of a plurality of keypoints. That feature vector descriptor describes what the keypoint looks like. The features selected are invariant to image translation, scaling, and rotation, partially invariant to illumination changes and robust to local geometric distortion. This may be done, for example, using a maxima and minima of the result of difference of Gaussians function applied in scale-space to a series of smoothed and re-sampled images.

In one embodiment, the imaging may be carried out using painted-on features, for example features that are applied using contrast. In an embodiment, a contrast may be used of white and black particles sprayed with an aerosol.

In an embodiment, the extraction of keypoints is carried out on the blue channel image. Then, at 315, information from the other color channel, here the red channel, can be used to find the corresponding features. Such feature-finding can employ cross-correlation as described herein.

At 320, the keypoints that have been obtained in this way have information about their 3-D location determined in the current time frame using defocusing. Each keypoint therefore is processed to obtain three-dimensional information corresponding to that keypoint, as well as its associated descriptors. This information forms a set of sparse keypoints with descriptors for the time frame t0.

In parallel with the Tentative Pose determination path 305, the dense point cloud path 306 is carried out to determine dense 3-D information, however, without descriptors. For the time period t0, step 325 starts by determining a dense 3-D cloud of points, using defocused information. This may be done by cross correlating between the blue and red channels at 330 to find many corresponding points or image pixels between these channels. The 3-D locations of these points are obtained at 335. The defocused information from the two channels is used to determine this 3D information.

At 340, both the pose and 3-D point cloud determination have been carried out. At timeframe t0, there are now two sets of 3-D point clouds: a sparse set with descriptors (from the path 305) and a dense cloud without descriptors (from the path 306).

At 345, the next part of the operation proceeds that finds the next t, called t1. The process continues to iterate to find multiple different values at multiple different time frames.

Figure 6:
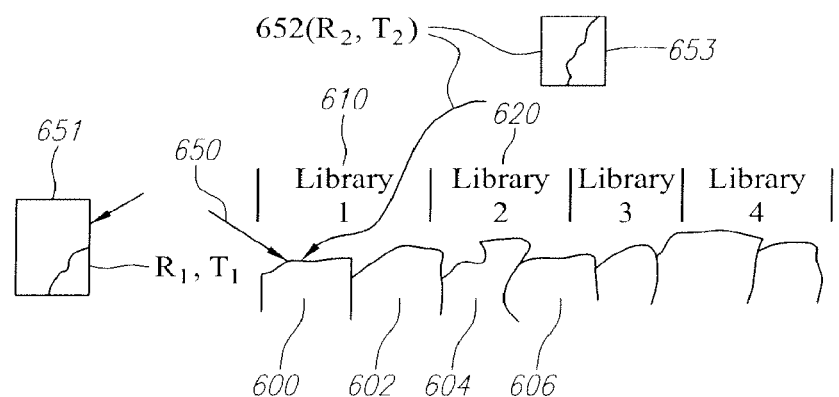
FIG. 6 illustrates the use of multiple different libraries in connection with obtaining images of a subject's teeth.

According to the operation, there are multiple different libraries of dense and sparse point sets for the overall object. For example, FIG. 6 shows how this would be used to obtain images of a scan subject's teeth such as 600, 602, 604, 606 and others. A first library 1 at 610 represents the field of view that can be obtained from the scanner from a single scan. This may image, for example, teeth 600, 602. However, tooth 604 is not within the field of view of the scanner within library one 610. Therefore, library 2 shown as 620 may be used to capture the image of the teeth 604, 606. The different libraries may each represent a different reference.

Pose Methodology Overview

The initial camera position determination (yielding the "Tentative Pose") provides rotation and translation R & T in real-time matched in the t dimension. This employs one or more robust matching techniques (e.g., carried out through cross-correlation as described above and/or by comparing keypoints) that is accepting of differences between points. Subsequent to this activity, feature matching, optionally, through pose based warping refines the pose (yielding the Rough Pose) between matchable frames. Post-processing typically uses that Rough Pose information. The Rough Pose provides more information about a selected frame and allows full matching, again—optionally, through pose based warping to spatially-related frame(s) to determine more accurate pose points (yielding the "True Pose") by taking advantage of the additional a priori knowledge.

Tentative Pose Determination

In FIG. 3B, the operation of determining the Tentative Pose is started. At 350, the current point set is compared with the previous point set via cross-correlation techniques. At 355, a determination is made if there is a cross-correlation or "CC" match between the point sets. If so, then 360 determines that there are two matched dense point clouds, and control passes to node 3C, step 390, which carries out a processing operation shown in FIG. 3C which represents the comparing and forming of the libraries.

If there is not a CC match at 355, then control passes so that at 365 robust descriptors (e.g., SIFT descriptors) of the previous group of frames are used, where the group of frames can be, for example, between 20 frames and 100 frames. At 370, it is determined if there is a match on the previous 20-100 frames and the current frame. If so, this establishes a match between sparse point clouds at 375, and control passes to the library node 3C (FIG. 3C).

If there is no match between the current frame and the previous 20-100 frames, then pose recovery is carried out at 380 using the descriptors on a stored library of key points. This compares the robust descriptors with the entire library of keypoints that has been created. If there is a match, then this is taken as the Tentative Pose, and control passes to the library determination at 3C. If there is no match at 385, this means, at 386, that all reference frames are too far away from the current frame. At this point, the current frame is rejected (i.e., discarded).

Rough Pose Determination

FIG. 3C continues pose determination using the Tentative Pose which has been found in FIG. 3B. This begins with step 391, which obtains the Tentative Pose information, and then at 392 determines if there is a close CC frame. If the result of the action at 392 is that there is no close enough CC frame, then all the frames are too far away, and the frame is discarded. Or it may be added as a library reference for future CC activity. However, if there is a close enough CC frame, then it is obtained at 393 and the new frame is warped to the older frame (i.e., the frames are projected at 393 and cross-correlated at 394).

Generally, the operation is an attempt to find, for a plurality of different vectors (scene position values), which vectors are most close by. The object is to cross correlate vectors which are as distant as possible, as long as they are still correlatable. FIG. 8 graphically details the frame finding and translating involved in projecting the planes as referenced above.

Returning to FIG. 3C, after the projection at 393, $R_0$, $T_0$ is used to cross correlate the current frame to the found frame. This is used to find the new pose (the Rough Pose) R and T. If the R and T can be found at 395, then this more-refined pose can be used for aggregating 3-D point cloud data, at 399, for the purpose of display on a user interface device (e.g., computer monitor). If not, the current frame is compared to the SIFT references at 396. If R and T are not found at this stage 397, it is added as a SIFT reference at 398. Otherwise, the processing is complete, and operation proceeds to get the next point at step 3A.

Note in the above that the three dimensional points and keypoints in the current frame are matched to keypoints in multiple different previous time frames via the descriptors. That is, for each core frame tn, each keypoint is matched to each of a plurality of previous frames t(n−x), where x can be a set number. For example, x may be set to any number between 0 and 10000 depending on available processing power and memory. In the embodiment, this is described as being between 20 and 100 frames. This thereby matches each of a number of frames to the core frame.

At 350, the matches are used to find a transformation from the current frame to the previous frames. This operation determines a transformation Tn (translation and rotation) between frame n, and all other frames that are going to be compared to frame n. This same information also represents the transformation for the dense points. In this way, all of the frames end up in a single coordinate system called the reference coordinate system. The reference coordinate system is arbitrary, but in general stays the same throughout all reference frames. The reference frame can change from time to time, as described herein, when the motion of the camera causes an image of the subject has moved too far from its original location.

According to another embodiment, many different frames can be used as base/reference frames, so that there are many different transformations. For example, there can be new base frames every specified time. In yet another embodiment, transformations can be found, so that there can be intermediate frames. In still another embodiment, instead of combining the transformations, an average of the transformations may be used.

At 360 (in FIG. 3B), the transformation is made between the reference frame and any other frame tn. This forms a library of data that is all in the same coordinate system. All of the data is in a single coordinate system, where that coordinate system is in essence randomly selected.

This serial transformation may minimize the number of transformations that are combined for any given frame to thereby minimize error propagation.

Figure 7:
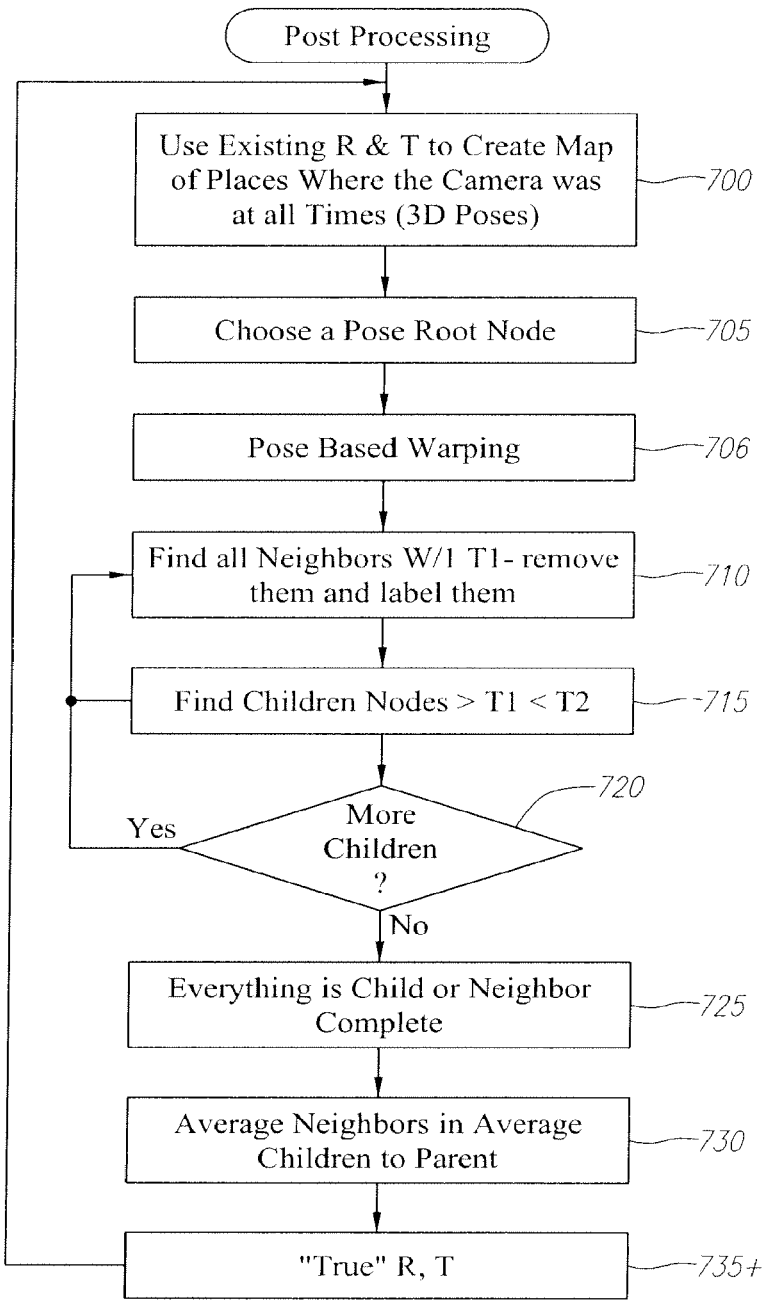
FIG. 7 shows the way in which global matching is carried out.

After the dense sets have been transformed to enable production of a full resolution image in FIGS. 3A-3C (e.g., for display purposes only during scanning as user feedback during the process), a post-processing of the pose is carried out as shown in FIG. 7. This post-processing may use a "global matching technique" to allow better frame matching while minimizing error propagation to find the True Pose as defined above and deliver a final scan output product (e.g., a STL file embodied in computer-readable medium) for producing a physical object from the representative data by CNC or other production techniques.

Further-Refined/True Pose Determination

Figure 5:
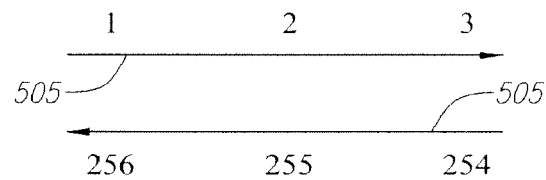
FIG. 5 diagrammatically illustrates a scanning procedure.

As a preface to describing this global matching approach, FIG. 5 shows how a camera may be moved between different positions as it images a larger area. The top part in FIG. 5 shows the camera moving in direction 500, while the bottom part is shown going in direction 505. Frames are obtained in the order shown 1, 2, 3 . . . 254, 255, 256. As one is going through the images sequentially, one might take an image 10 times a second. While frames 1 and 2 are close in time, there may actually be more similarities between frames 1 and 256. For example, the camera may be spatially closer in $\frac{1}{256}$ than at $\frac{1}{2}$.

The present approach accounts for this possibility by pursuing the best spatial matches in comparing image data to determine the camera pose information used to combine the images. Other systems (e.g., Zhang) focus on closest time matches (i.e., sequential frames) in determining pose.

In actual practice, the inventors found that there is indeed no way to predict in advance which of the different frames produce the best spatial match. The best information is actually obtained by finding a tentative/provisional match, and then refining that tentative match to a collection of different frames.

In recognition of this issue, the referenced post processing is carried out globally. Rather than automatically comparing one frame with the next frame, the processing of this embodiment looks at the entire library of different frames. For example, you might get more information about the current frame from an old frame because it is spatially closer.

The inventors found the unexpected result that matching concurrently to multiple frames produces better results than matching to consecutive frames. This global matching system in essence looks at the entire point library to keep track of the same points across multiple frames as far as can be done, and averaging that information. All of the descriptors in that whole library can be compared, to find the "best descriptor" to compare the points that have those best descriptors. Since that point is on the item being imaged, averaging that point across multiple frames provides more information about that point. Because of the averaging, the multiple frames each contribute pose information to other spatially nearby frames. Averaging may also be used to more accurately find their true locations by eliminating various kinds of stochastic noise.

The post-processing uses global matching between the different frames from as far away as possible. Different frames containing different views of the same point represent that same point. Since those points are always the same, averaging between them will increase their accuracy. According to the present system, the points are averaged without accumulating errors of the point locations between the frames.

Such post-processing is shown in detail with reference to the flowchart of FIG. 7. At 700, the best existing rotation and translation R, T (typically, the Rough Pose) have been obtained. This has created a map of all places where the camera was at all times. Each place at each time corresponds to a specific 3D pose.

At 705, a pose is selected as the root node for this library. This can be selected in essence at random, for example by selecting the first pose in the list. Alternatively, a criteria can be selected, for example by taking the centroid point as the root node pose.

At 710, the operation continues by finding all neighbors that are close to the chosen pose. The operation creates information that represents a graph of all 3D poses based on proximity.

First, pose based warping is carried out at 706 to warp the poses to look more like one another. The pose based warping is described in detail with reference to FIG. 9, herein.

After the warping, all neighbor poses that are within T1 of the starting pose are found at 710. Each of these neighbor poses are removed and labeled. T1 is a value that is chosen to be the maximum workable distance to reduce error propagation, but still limited by feasibility of the calculations.

At 715, after the neighbor poses have been removed, a second threshold T2 is used to find child poses. All of the poses that are left are not neighbors to the root node. The threshold T2 is such that there is minimal or no overlap between the images in a different reference plane. T2 is larger than T1 and is chosen as the maximum distance for which you can find a pose via pose based warping. The points that are within T2 to the root node are called Children nodes. Anything beyond T1+T2 is too far from the root, and hence the T1 of the child will not be affected by the parent.

All the points are analyzed in this way. Flowchart element 720 represents continuing this operation, until all children are found. At 725, all the nodes within the library are either a child or a neighbor. At this point, this subprocess is called "complete".

At 730, each of the neighbors to the root node are averaged in with the root node. Each of the neighbors to the children are also averaged with all of its children. This creates heavyweight nodes that have been an averaged with a number of different neighbors forming an average pose value.

At this point, the translation between the children and the root are determined. The children are translated to determine where the child node is in the parent node. The heavyweight child nodes are then translated and averaged in with the parent. Such action forms very heavyweight nodes that are based on many different poses. The pose as averaged in this way provides a very accurate depiction of the root node that has been improved by averaging. The new R,T obtained at 735 is a heavyweight average between the root node selected as 705, and all of its neighbors and children.

This new R and T is used as a post processed pose (the most refined, True Pose), to re-calculate the 3-D value with greater accuracy.

An advantage of this system is that the same points from multiple frames can be averaged with one another without the error stack up as would possibly occur from a temporal technique. Also, the operations are carried out only one layer deep, so error does not propagate through layers. This means that the cross-correlation point identification error does not propagate.

Variations

One embodiment carries out certain parts of the image processing, including interpolating between values, using a bicubic spline function. According to an embodiment, the bicubic spline function forms a set of spline coefficients. Each coefficient is used to calculate the next coefficient. The list of coefficients is causal in that one coefficient effects values of other coefficients.

According to an embodiment, the bi cubic spline function is simplified by using only some previous number of coefficients as a sliding window across the spline coefficients. The inventors found that this sliding window can be selected (here by 16 blocks) to a value that does not effect the bicubic spline calculation. For example, by using 16 blocks, the error in coefficients can be less than the precision of the floating-point variable. However, by reducing the result in this way, each item can be simultaneously calculated in shaders of the GPU. This allows massively parallel processing, so that each single shader can calculate a part using only the 16 coefficients in this way, therefore allowing each shader to calculate a value for one pixel.

Importantly, the inventors found when a process such as this is done on the GPU, it is important to maintain all of the values in the shader. For example, some of the calculations such as the bicubic spline can be carried out faster on the shader, but other calculations such as sorting and comparing may be carried out faster on a processor. However, the inventors found that writing between the shaders and the main processor takes more time, and therefore it is faster to do everything in the shader, even those things which are less efficiently carried out in the shader. The pose based warping uses bicubic spline calculations as described above, and parts or all of this calculation may also be more efficiently carried out in the GPU, according to one embodiment.

Another operation, carried out before the CC operation, may weight the center, left and right values more than the others.

Another operation may take the standard deviation of all values in the final 16.times.16 square carried out as part of the cross-correlation operation. Any standard deviation values higher than a specified peak of the images are truncated so that those peaks do not bias the data. This removes the abnormally bright pixels to avoid biasing the data.

Another operation may take advantage of the known value that the blue/red apertures are shifted in only one dimension. Therefore, for the cross-correlation subdivisions, this one dimension shift may represent the maximum displacement that can occur. Any displacement which is greater than this can be detected in the cross-correlation subdivisions, and used to weight the final value.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of matching other than cross-correlation can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. While many of these embodiments discuss 64 bits, 128 or 256 bit processors or processing can alternatively be used. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An improved imaging apparatus, the apparatus comprising an image sensor; an array of apertures, arranged in a pattern having a specified shape, arranged between said imaging sensor and a scene; a lens part, the lens part, the imaging sensor and the apertures being arranged to capture light reflected from or emitted by a large plurality of isolated distinguishable points of the scene that pass through each of the plurality of apertures and that is received at the image sensor as a plurality of isolated distinguishable point images, the isolated distinguishable point images each including a number of image points that is equal to a number of the plurality of apertures; and a processor to analyze each image point in each isolated distinguishable point image from the image sensor to determine relative positions of each isolated distinguishable point in the scene relative to each other isolated distinguishable point in the scene to map a complete three dimensional image of the scene, wherein the improvement comprises:

the image sensor having three color channels; and
the array of apertures consisting of two apertures, each aperture coded to one of two lighting element colors to isolate the distinguishable points of the scene onto corresponding image sensor color channels.

2. The apparatus of claim 1, comprising a plurality of lighting elements of only two colors.

3. The apparatus of claim 2, wherein the colors channels of the image sensor are red, green and blue, and the colors of the lighting elements are red and blue.

4. An improved method comprising imaging a scene using a plurality of the apertures arranged in a pattern of a specified shape by allowing light from the scene to pass only through the plurality of apertures onto an imager; associating each of the apertures with a different and separate portion of the imager, so that light which passes through each aperture is imaged on a different portion of the imager; capturing light reflected from or emitted by a large plurality of isolated distinguishable points of the scene that pass through each of the plurality of apertures and that is received at the imager as a plurality of isolated distinguishable point images, the isolated distinguishable point images each including a number of image points that is equal to a number of the plurality of apertures; and analyzing each image point in each isolated distinguishable point image from the imager to determine relative positions of each isolated distinguishable point in the scene relative to each other isolated distinguishable point in the scene to map a complete three dimensional image of the scene, the improvement comprising:

providing an imager with three color channels for the imaging; and
utilizing only two apertures and two of the three channels to accomplish the imaging.

5. The method of claim of claim 4, wherein the three channels provided are red, green and blue, and the two channels utilized are red and blue.

* * * * *